United States Patent
McIntosh et al.

(10) Patent No.: US 10,019,713 B1
(45) Date of Patent: *Jul. 10, 2018

(54) APPARATUS AND METHOD FOR VERIFYING TRANSACTIONS USING VOICE PRINT

(71) Applicant: RED HAT, INC., Raleigh, NC (US)

(72) Inventors: Jonathan P. McIntosh, Omaha, NE (US); Terrance Currey, Omaha, NE (US)

(73) Assignee: RED HAT, INC., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/366,622

(22) Filed: Dec. 1, 2016

Related U.S. Application Data

(63) Continuation of application No. 14/305,105, filed on Jun. 16, 2014, now Pat. No. 9,530,136, which is a continuation of application No. 13/323,844, filed on Dec. 13, 2011, now abandoned, which is a continuation of application No. 12/730,006, filed on Mar. 23, 2010, now Pat. No. 8,095,369, which is a
(Continued)

(51) Int. Cl.
| | |
|---|---|
| *G06F 21/32* | (2013.01) |
| *G06Q 20/40* | (2012.01) |
| *G06Q 20/30* | (2012.01) |
| *G06Q 20/24* | (2012.01) |
| *G06Q 20/16* | (2012.01) |
| *G10L 17/06* | (2013.01) |

(52) U.S. Cl.
CPC ....... *G06Q 20/40145* (2013.01); *G06Q 20/16* (2013.01); *G06Q 20/24* (2013.01); *G06Q 20/305* (2013.01); *G06Q 20/409* (2013.01); *G10L 17/06* (2013.01)

(58) Field of Classification Search
CPC .......................................... G10L 21/32
USPC ....................................... 704/273
See application file for complete search history.

(56) References Cited

U.S. PATENT DOCUMENTS

| | | |
|---|---|---|
| 3,752,904 A | 8/1973 | Waterbury |
| 4,752,676 A | 6/1988 | Leonard et al. |

(Continued)

OTHER PUBLICATIONS

Associated Press, Telemarketing Firm Agrees to Alter Sales Policy, Times Union, Sep. 19, 2000, p. E.1.
(Continued)

*Primary Examiner* — Susan McFadden
(74) *Attorney, Agent, or Firm* — Haynes and Boone LLP

(57) ABSTRACT

A system, apparatus, and method for verifying that a consumer seeking to conduct a transaction with a merchant is authorized to use an associated account. An exemplary embodiment of the apparatus may include a voice response unit, a storage medium, and a voice print comparator. The voice response unit may obtain a test voice print. The storage medium may store information associated with the consumer, and a control voice print associated with the information. The voice print comparator may receive the control voice print from the storage medium, compare the test voice print to the control voice print, determine a match level signal indicating a degree of match between the test voice print and the control voice print, compare the match level signal and a predefined threshold, and determine an approval for a transaction based on the comparison of the match level signal and the predefined threshold.

20 Claims, 12 Drawing Sheets

Related U.S. Application Data continuation of application No. 11/539,012, filed on Oct. 5, 2006, now Pat. No. 7,716,055, which is a continuation of application No. 10/186,208, filed on Jun. 27, 2002, now Pat. No. 7,130,800, which is a continuation-in-part of application No. 09/437,591, filed on Nov. 9, 1999, now Pat. No. 6,401,066.

(56) References Cited

U.S. PATENT DOCUMENTS

| | | |
|---|---|---|
| 4,993,068 A | 2/1991 | Piosenka et al. |
| 5,153,918 A | 10/1992 | Tuai |
| 5,412,727 A | 5/1995 | Drexler |
| 5,414,755 A | 5/1995 | Bahler |
| 5,504,805 A | 4/1996 | Lee |
| 5,513,250 A | 4/1996 | McAllister |
| 5,517,558 A | 5/1996 | Schalk |
| 5,581,630 A | 12/1996 | Bonneau, Jr. |
| 5,623,539 A | 4/1997 | Bassenyemukasa |
| 5,634,086 A | 5/1997 | Ritschev et al. |
| 5,638,430 A | 6/1997 | Hogan et al. |
| 5,664,050 A | 9/1997 | Lyberg |
| 5,768,382 A | 6/1998 | Schneier et al. |
| 5,819,029 A | 10/1998 | Edwards |
| 5,838,768 A | 11/1998 | Sumar et al. |
| 5,862,325 A | 1/1999 | Reed et al. |
| 5,872,834 A | 2/1999 | Tietelbaum |
| 5,884,262 A | 3/1999 | Wise et al. |
| 5,903,225 A | 5/1999 | Schmitt et al. |
| 5,915,001 A | 6/1999 | Uppaluru |
| 5,940,476 A | 8/1999 | Morganstein |
| 5,987,155 A | 11/1999 | Dunn et al. |
| 6,011,858 A | 1/2000 | Stock et al. |
| 6,038,334 A | 3/2000 | Hamid |
| 6,049,602 A | 4/2000 | Foladare et al. |
| 6,058,303 A | 5/2000 | Astrom et al. |
| 6,070,241 A | 5/2000 | Edwards |
| 6,084,967 A | 7/2000 | Kennedy et al. |
| 6,088,731 A | 7/2000 | Kiraly |
| 6,091,835 A | 7/2000 | Smithies et al. |
| 6,092,192 A | 7/2000 | Kanevsky et al. |
| 6,094,476 A | 7/2000 | Hunt et al. |
| 6,119,084 A | 9/2000 | Roberts |
| 6,144,938 A | 11/2000 | Surace et al. |
| 6,149,056 A | 11/2000 | Stinson et al. |
| 6,163,768 A | 12/2000 | Sherwood et al. |
| 6,167,517 A | 12/2000 | Gilchrist et al. |
| 6,266,640 B1 | 7/2001 | Fromm |
| 6,275,940 B1 | 8/2001 | Edwards |
| 6,292,480 B1 | 9/2001 | May |
| 6,314,402 B1 | 11/2001 | Monaco |
| 6,359,971 B1 | 3/2002 | Haimi-Cohen et al. |
| 6,370,508 B2 | 4/2002 | Beck et al. |
| 6,401,066 B1 | 6/2002 | McIntosh |
| 6,501,956 B1 | 12/2002 | Weeren et al. |
| 6,535,582 B1 | 3/2003 | Harris |
| 6,604,075 B1 | 8/2003 | Brown et al. |
| 6,650,736 B1 | 11/2003 | Unger |
| 6,799,163 B2 | 9/2004 | Nolan |
| 6,804,331 B1 | 10/2004 | Vacek et al. |
| 6,862,343 B1 | 3/2005 | Vacek et al. |
| 6,978,238 B2 | 12/2005 | Wohlsen et al. |
| 6,990,454 B2 | 1/2006 | McIntosh |
| 7,130,800 B1* | 10/2006 | Currey .............. H04M 3/42136 |
| | | 379/88.22 |
| 7,512,221 B2* | 3/2009 | Toms ...................... G10L 17/22 |
| | | 379/114.14 |
| 7,536,352 B2 | 5/2009 | Lapsley et al. |
| 7,689,832 B2 | 3/2010 | Talmor et al. |
| 7,716,055 B1* | 5/2010 | McIntosh ................ G06F 21/32 |
| | | 379/88.02 |
| 7,814,332 B2 | 10/2010 | Beenau et al. |
| 8,095,369 B1 | 1/2012 | McIntosh |
| 8,271,285 B2 | 9/2012 | Hansen |
| 8,768,709 B1* | 7/2014 | McIntosh ................ G06F 21/32 |
| | | 704/273 |
| 9,530,136 B1* | 12/2016 | McIntosh ................ G06F 21/32 |
| 2006/0140460 A1* | 6/2006 | Coutts ................ G06K 9/00885 |
| | | 382/124 |
| 2007/0198849 A1* | 8/2007 | Mozer ..................... G06F 21/32 |
| | | 713/186 |
| 2016/0328549 A1* | 11/2016 | Cui ......................... G06F 21/32 |

OTHER PUBLICATIONS

Bruce, Laura, Face-Scanning, Fingerprinting ATMs Gain Ground, Bankrate.com, Mar. 2, 2001.

IBM, VoicePrint Security for Credit Cards, IBM TDB, Feb. 2004, pp. 189-190, Issue 37, 2B.

ISA, Iris Recognition Could Smooth Identification, The Instrumentation Systems, and Automation Society, www.isa.org, Jul. 31, 2000.

Neurotechnologia, Ltd., Fingerprint and Eye Iris Pattern Identification Software, Libraries and Source Code, www.neurotechnologija.com, Apr. 15, 2002.

Niccolai, James, Comdex: Biometrics Puts a Face—or Finger—on Security, InfoWorld Media Group, Inc., Nov. 15, 2001.

PriceInteractive, PriceInteractive Launches Most Reliable Anti-Slamming Device, PR Newswire via News Edge, Jul. 1, 1999.

Voicelog, Bray Joins VoiceLog as Director of Live Operator Verification Services, Press Release, www.voicelog.com, Oct. 28, 2003.

Voicelog, FCC Acknowleges Validity, Value of Automated Third Party Verification, Press Release, www.voicelog.com, Aug. 24, 2000.

Voicelog, Total Slamming Control—The Ultimate in Third Party Verifcation, Press Release, www.voicelog.com. May 11, 1998.

Voicelog, Voicelog and Telecommunications on Demand Announce Distribution Agreement, Press Release, www.voicelog.com, Nov. 12, 1997.

Voicelog, Voicelog and TSS AG (Switzerland) Bring Third Party Verification to Europe, Press Release, www.voicelog.com, Jan. 17, 2001.

Voicelog, Voicelog Announces Cost Effective Verification for Electric Service, Press Release, www.voicelog.com. Jan. 6, 1998.

Voicelog, Voicelog Announces CPNI Verification Products, Press Release, www.voicelog.com, Mar. 4, 1998.

Voicelog, Voicelog Announces Dual Channel Recording, Press Release, www.voicelog.com, Jan. 4, 2000.

Voicelog, Voicelog Announces Easy Recording Download Function, Press Release, www.voicelog.com, Mar. 1, 2000.

Voicelog, Voicelog Announces Free Speech TPV—Speech Recognition-Based Verification at Touchtone Prices, Press Release, www.voicelog.com. Jan. 6, 2004.

Voicelog, Voicelog Announces High Quality Name and Address Transcription, Press Release, www.voicelog.com, Feb. 1, 2000.

Voicelog, Voicelog Announces Inbound That Delivers, Press Release, www.voicelog.com, Oct. 2, 2000.

Voicelog, Voicelog Announces Live Operator Third Party Verification, Press Release, www.voicelog.com, May 1, 2001.

Voicelog, Voicelog Announces Package for New FCC Rules, Press Release, www.voicelog.com, Jan. 30, 2002.

Voicelog, Voicelog Announces Package for New FCC Rules, Press Release, www.voicelog.com, Jan. 30, 2001.

Voicelog, Voicelog Announces Quick Freeze the New Third Party Verification Program for Carrier Freezes* to Meet the FCC Anti-Slamming Rules, Press Release, www.voicelog.com, Jan. 12, 1998.

Voicelog, Voicelog Announces True State-Specific Third Party Verification, Press Release, www.voicelog.com, May 9, 2000.

Voicelog, Voicelog Announces "Verifiably Able" New Program Offers Meaningful Employment to Physically Challenged, Press Release, www.voicelog.com, May 28, 2002.

Voicelog, Voicelog Announces voice Recognition for Third Party Verifications, Press Release, www.voicelog.com, Nov. 4, 1997.

Voicelog, Voicelog Announces Winter Weather Insurance for Third Party Verifications, Press Release, www.voicelog.com, Oct. 31, 1997.

(56) References Cited

OTHER PUBLICATIONS

Voicelog, Voicelog Appoints Karl Erickson As Chief Technology Officer, Press Release, www.voicelog.com, Oct. 7, 2002.
Voicelog, Voicelog Closes 1998 With Two Million Third Party Verification Transactions—Now the Leader in Preventing Slamming, Press Release, www.voicelog.com, Jan. 30, 1998.
Voicelog, Voicelog Goes to the Ends of the Earth to Review Third Party Verification, Press Release, www.voicelog.com, Feb. 29, 2000.
Voicelog, Voicelog Guarantees Third Party Verification Compliance, Press Release, www.voicelog.com, Sep. 23, 1997.
Voicelog, Voicelog Helps Telemarketers Meet New Telephone Sales Rule by Mar. 31 Deadline, No Need to Make Capital Investment to Record Telemarketing Sales, Press Release, www.voicelog.com, Mar. 12, 2003.
Voicelog, Voicelog is First Choice for Third Party Verification, Press Release, www.voicelog.com, Aug. 10, 1998.
Voicelog, Voicelog Meets Anti-Slamming Rules for E-commerce Internet Orders, Press Release, www.voicelog.com, Jan. 27, 1999.
Voicelog, Voicelog Offers Industry-Wide Solution to "Cramming", Press Release, www.voicelog.com. Apr. 21, 1998.
Voicelog, Voicelog Offers Sarbanes-Oxley Employee Hotline Solution, Press Release, www.voicelog.com, Oct. 7, 2003.
Voicelog, Voicelog Offers Third Party Verification for Wireless Number Portability, Press Release, www.voicelog.com, Oct. 31, 2003.
Voicelog, Voicelog Passes Half-Million Mark for Live Operator Verification Services Adds New Features and Functionality, Press Release, www.voicelog.com. Feb. 24, 2003.
Voicelog, Voicelog Ranked 77th in Inc Magazine's "Inc 500" for 2002, Press Release, www.voicelog.com. Oct. 15, 2002.
Voicelog, Voicelog Reaches 100 Accounts in 1997, Press Release, www.voicelog.com. Jan. 2, 1998.
Voicelog, Voicelog Releases Study on State Attitudes Towards FCC Anti-Slamming Rules, Press Release, www.voicelog.com, Apr. 14, 1999.
Voicelog, Voicelog Scores a Win for Telecom Industry Against "Drop-Off" Rule Seeks Partners for Potential Suit Against FCC to Overturn, Press Release, www.voicelog.com, Mar. 27, 2003.
Voicelog, Voicelog Third Party Verification Helps Telecommunications Industry Meet New FCC Anti-Slamming Rules, Press Release, www.voicelog.com, Dec. 20, 1998.
Voicelog, Voicelog Third Party Verification Releases Free Analysis of New FCC Anti-Slamming Rules, Press Release, www.voicelog.com. Feb. 9, 1999.
Voicelog, Voicelog Third Party Verification Releases Updated Anti-Slamming Rules Report, Press Release, www.voicelog.com, Mar. 16, 1999.
Voicelog, VoiceVerified Helps Telemarketers Meet New FTC Sales Rule, Press Release, www.voicelog.com, May 1, 2003.
Voicelog, Voicelog's 50 State "Anti-Slamming Rules Report" Available on the Internet, Press Release, www.voicelog.com, Feb. 4, 1998.
Yang, S. Jae, A New Look in Security, PC Magazine, www.pcmag.com, Jan. 15, 2002.

\* cited by examiner

Sample Record

| | |
|---|---|
| 302 — Record Number | |
| 304 — Name | |
| 306 — Address | |
| 308 — Social Security # | |
| 310 — Birth Date | |
| 312 — Voice Recording (variable length record) | Name, Address, Telephone #, Social Security #, Birth Date Consent to Question 1 Consent to Question 2 |
| 314 — | |

APPARATUS AND METHOD FOR VERIFYING TRANSACTIONS USING VOICE PRINT

CROSS-REFERENCE TO RELATED APPLICATIONS

The present application is a continuation of and claims priority from U.S. patent application Ser. No. 14/305,105, filed Jun. 16, 2014 and titled APPARATUS AND METHOD FOR VERIFYING TRANSACTIONS USING VOICE PRINT, which is a continuation of and claims priority from U.S. patent application Ser. No. 13/323,884, filed Dec. 13, 2011 and titled APPARATUS AND METHOD FOR VERIFYING TRANSACTIONS USING VOICE PRINT, which is a continuation of and claims priority from U.S. patent application Ser. No. 12/730,006, filed on Mar. 23, 2010 and titled APPARATUS AND METHOD FOR VERIFYING TRANSACTIONS USING VOICE PRINT, now issued U.S. Pat. No. 8,095,369, issued Jan. 10, 2012, which is a continuation of and claims priority from U.S. patent application Ser. No. 11/539,012, filed on Oct. 5, 2006, now issued U.S. Pat. No. 7,716,055, issued on May 11, 2010 and titled APPARATUS AND METHOD FOR VERIFYING TRANSACTIONS USING VOICE PRINT, which is a continuation of and claims priority from U.S. patent application Ser. No. 10/186,208, filed on Jun. 27, 2002, now issued U.S. Pat. No. 7,130,800, issued on Oct. 31, 2006 and titled THIRD PARTY VERIFICATION SYSTEM, which is a continuation-in-part of U.S. patent application Ser. No. 09/437,591, filed on Nov. 9, 1999, now issued U.S. Pat. No. 6,401,066, issued on Jun. 4, 2002 and titled AUTOMATED THIRD PARTY VERIFICATION SYSTEM, the entire contents of these applications and patents are incorporated in their entirety by reference herein.

SUMMARY OF THE INVENTION

In a first aspect of the invention, an apparatus may be provided that includes a voice response unit, a storage medium, and a voice print comparator The voice response unit may be configured to obtain a test voice print during a transaction between the consumer and the merchant. The storage medium may be configured to store an account number associated with the consumer, and a control voice print associated with the account number. Also, the voice print comparator may be configured to receive the control voice print associated with the account number, compare the test voice print to the control voice print, and to return a match level signal indicating a degree of match therebetween. From the match, the merchant may decide whether the consumer is authorized to use the account.

In a second aspect of the invention, a method may be provided of verifying that a consumer seeking to conduct a transaction with a merchant using an account is authorized to use account. The method may comprise: obtaining a test voice print from the consumer during a transaction between the consumer and the merchant; obtaining an account number for the account; obtaining a control voice print associated with the account number; comparing the control voice print to the test voice print; identifying a level of match between the control voice print and the test voice print; and dispositioning at least one transaction in response to the level of match.

In a third aspect of the invention, a system may be provided that includes a server having a storage medium, wherein the storage medium is operable to store computer readable instructions which, when executed by the system perform methods of the invention.

BRIEF DESCRIPTIONS OF THE DRAWINGS

FIG. 3 is a sample record of the third party verification system;

Figure 11:
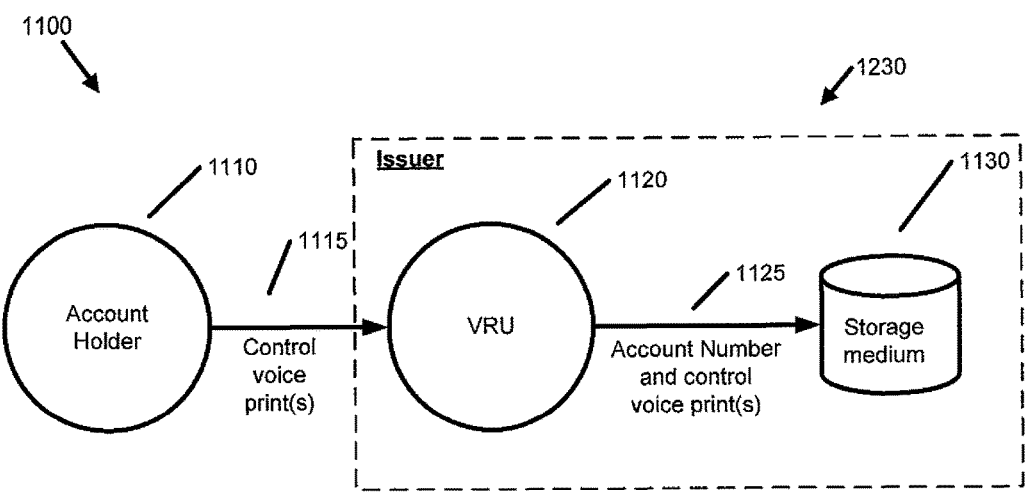
Figure 12:
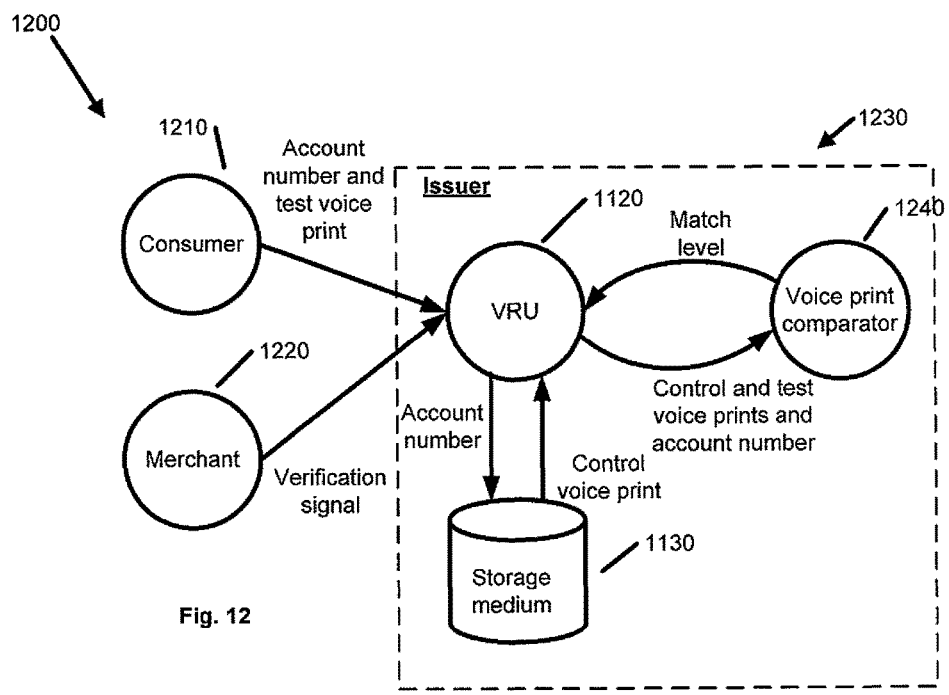

FIG. 11 is a combined flowchart and data flow diagram 1100 illustrating various components used to implement an enrollment process according to the invention; and FIG. 12 is a combined block diagram and data flow diagram illustrating various components that can be used to implement systems and methods for verifying that a consumer seeking to transact with a merchant using an account is authorized to use that account.

DETAILED DESCRIPTION OF THE INVENTION

Example Environment

Although other applications are possible, one example environment in which the subject invention can be implemented is a third party verification system as mandated by the Federal Communication Commission (FCC) anti-slamming provisions. In the example environment described herein, the present invention serves as a third party verification system for a long distance telephone service provider (the client) desiring to contact potential customers to gain market share. In general, long distance service providers desiring to increase market share call potential customers in hopes of convincing them to leave their existing long distance company. Upon confirming that the potential customer is interested in changing long distance companies, the customer is connected to the third party verification system so that the third party verification system described herein may obtain and permanently record the customer's verbal consent to the switch.

Next, the system stores the recorded vocal affirmation of the customer's desire to change long distance telephone service providers. The system stores the recording in digital form on a computer server so that it may be readily retrieved at a later date to thereby provide confirmation that the change in long distance service providers was indeed authorized.

To retrieve the customer's recorded consent an authorized party, such as the client, can retrieve or download the data via telephone or a customized Internet web server configured to access the voice recording.

Of course, this is but one possible environment of the present invention. Other possible environments that would benefit from the advantages of the present invention include, but are not limited to, other non-regulated or semi-regulated utilities such as electric utilities, cable utilities, cellular service providers, Internet service providers and the like. Other industries that may likewise benefit include any industry where products or services or offered or sold via telephone or computer such that some form of recorded statement, such as an agreement to provide remuneration in exchange for a product or service, would benefit from the present invention. Other envisioned areas of use include polling, petition drives, telephone stock trading, voting, collection agencies, environments where confirmation is legally required, travel agents or airlines booking travel itineraries and tickets, mortgage brokers, banks, automotive or other vehicle service departments or any other entity requiring some form of verification.

First Embodiment

Although the present invention may be configured for use in numerous different fields, for purposes of understanding the present invention is described in a configuration of a third party verification system as used by long distance telephone service providers attempting to increase market share by direct calling telesales.

Figure 1:
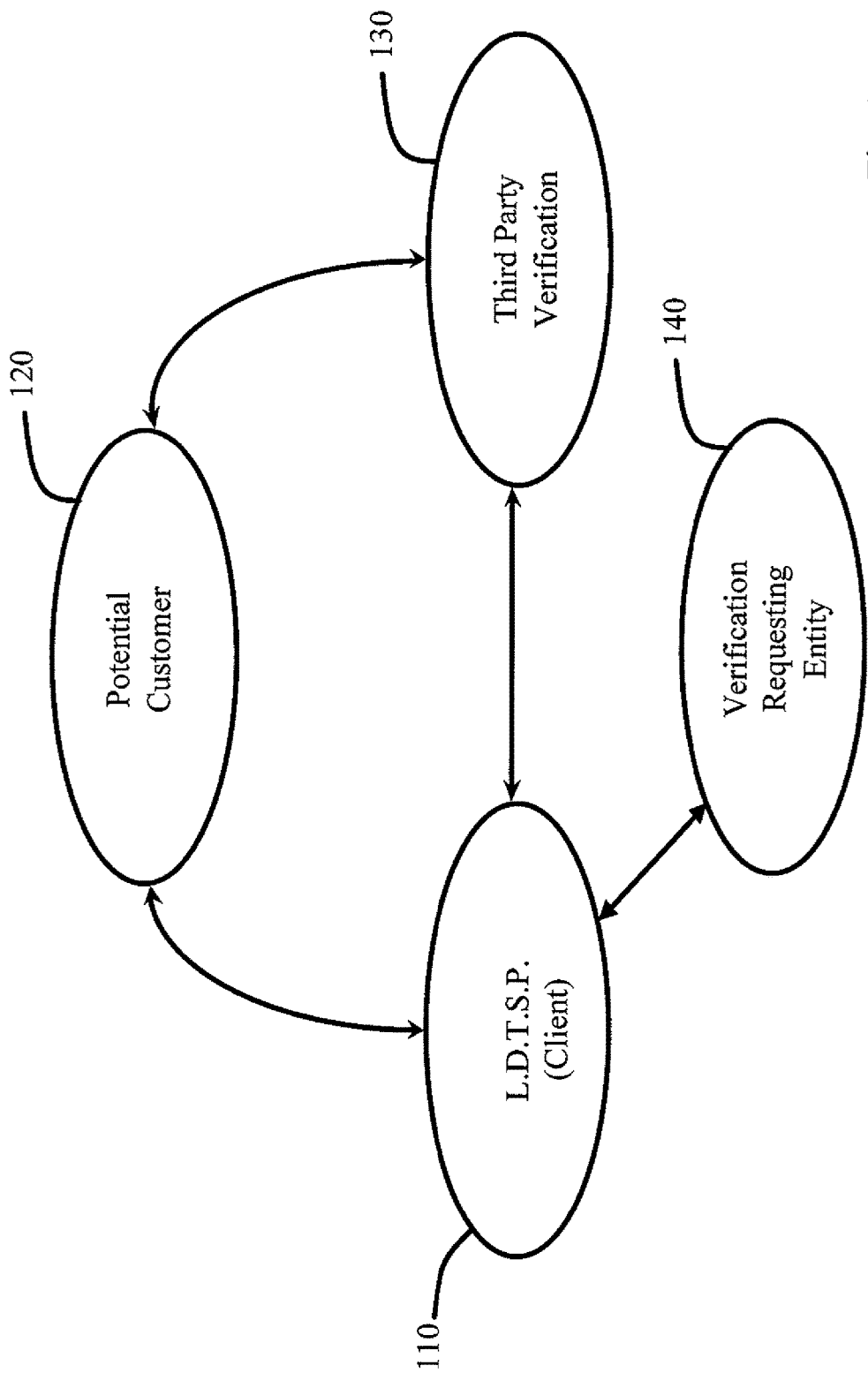
FIG. 1 is a block diagram of the participants in a third party verification process.

FIG. 1 illustrates the relationship between a long distance telephone service provider (L.D.T.S.P.) 110, a potential customer 120, and the third party verification system 130. In this embodiment, the L.D.T.S.P. 110 is the client. The client is defined herein as the party, individual, or entity that requires third party verification and is responsible for initiating the verification recording process. In other embodiments the client may include but is not limited to, a pollster, a magazine subscription seller, seller, utility, order taker or other party described above desiring some form of verification of a transaction, statement or agreement at a later date.

It is contemplated that, in one embodiment, the L.D.T.S.P. 110 performs telesales at a location remote from the potential customer 120 and from the third party verification system 130. The L.D.T.S.P. 110 would thus contact potential customers 120 by telephone, and upon obtaining customer consent to change long distance company, the L.D.T.S.P. would contact the third party verification system 130. Eventually the customer is connected to the third party verification system so that consent to the change in telephone service can be permanently recorded for later verification. Hence, communication occurs between each of the three entities 110, 120, and 130.

After obtaining verifiable consent to change long distance service providers, another verification requesting entity 140 or the customer 120 may request verification of the consent to change long distance companies. Accordingly, communication between the L.D.T.S.P. 110 and the third party verification system 130 occurs. In an alternative embodiment, the verification requesting entity 140 may directly contact the third party verification system 130.

In an alternative arrangement, an agent (not shown) performs telesales on behalf of the L.D.T.S.P. 110, thereby allowing the agent and the third party verification system 130 to be co-located.

Figure 2:
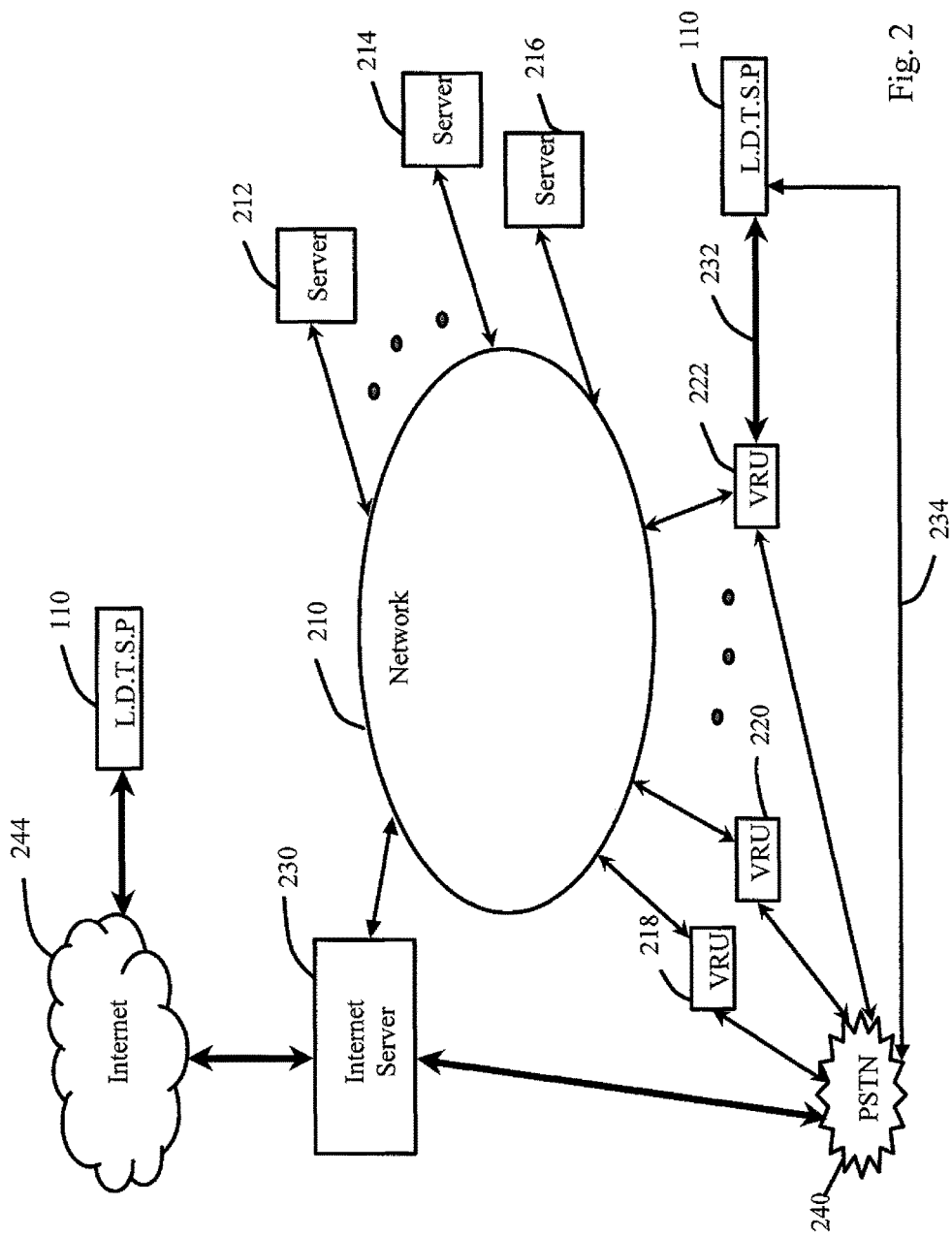
FIG. 2 is a block diagram of a third party verification system.

FIG. 2 illustrates one example configuration of the third party verification system of the subject invention. As shown, a network 210 forms a center hub to facilitate communication between: one or more servers 212, 214, and 216; one or more voice response units (VRU) 218, 220, and 222; one or more Internet servers 230; and various other support hardware (not shown). If remote from the third party verification system, the L.D.T.S.P. 110 connects via a high capacity dedicated line 232 to a voice response unit of the third party verification system. Alternatively, the L.D.T.S.P. 110 may connect via a standard telephone communication line 234 to the PSTN 240, the PSTN in turn connecting to the voice response unit 218.

Each voice response unit 218 provides automated answering, voice response and dual tone multi-frequency (DTMF) monitoring of incoming calls. The voice response unit 218 of the subject invention comprises a Pentium™-based motherboard having various interfaces and connectors. In one embodiment, the voice response unit comprises a housing containing a hard disk drive, a T1 card, a network (LAN) card, and PSTN interface card, all of which operate, in one example embodiment, under a Unix™ operating system. Each voice response unit 218, configured in accordance with one embodiment of the present invention, includes additional software configured to transfer data to and from the voice print servers. In one embodiment, this software is written in C programming language.

In one embodiment, the interface card comprises a Dialogic™ card. The Dialogic™ card interfaces with the T1 card to provide the functionality of voice synthesis, and voice recording. The Dialogic™ card also includes means for storing the digitized voice files before pushing the voice files to a voice print server. Dialogic Corporation is located in North America at Parsippany, N.J.

In one embodiment, the voice response unit 218 includes a dual T1 access configuration, thereby providing access for 48 incoming lines, 47 of which are voice channels and one of which is a data channel. The data channel in conjunction with the T1 card carries and properly assigns automatic number identification (ANI) data to each of the 47 voice channels. In the embodiment described herein, each voice response unit 218 is shared among various clients 110 to thereby more fully utilize the resources of the third party verification system, although it is contemplated that in other embodiments each voice response unit is dedicated to a particular entity. Each client 110, (in one example, each L.D.T.S.P.), is preferably provided a different access number to distinguish its records from those of other L.D.T.S.P.

Each of the one or more voice response units 218 connects to the network 210. The network 210 may comprise any one of many various configurations of networks available for use at the present time, such as token ring, Ethernet, or other network that may be developed in the future. The network 210 provides data routing services to hardware connected thereto. In one embodiment, the network 210 comprises a local area network.

Connecting to the network 210 are various servers 212-216. At least one server 212 is configured as a voice print server to store data records, including digitized voice recordings evidencing verification or consent such as to a change in long distance service provider. Servers 212 having large storage capacity are known by those of ordinary skill in the art and accordingly are not discussed in great detail herein.

In one embodiment, the servers 212-216 may comprise a Pentium™ based processing device having an array of large capacity hard disk drive storage devices. In one embodiment, the server 212 operates under the control of Linux™ operating system, although in other embodiments other operating system may be adopted.

Each server 212 preferably includes some form of database software to catalogue and manage each of the plurality of verification voice print records. One SQL-type database software well suited to this particular task is available from Informix™ of Menlo Park, Calif. However, other database programs such as DBZ™ and Oracle™ may also be configured to achieve the function of the present invention.

Also included in server 212 are associated disk drive array controllers, network cards, I/O cards, and the like. As these types of devices are known by those of ordinary skill in the art, their construction and operation is not discussed in detail herein.

One or more Internet servers 230 also connect to the network 210. The Internet server 230 hosts software responsible for operation of the web site capable of providing access, via the network 210, to the voice print server 212 for record retrieval. Due to the wide spread expansion of the Internet 244, Internet servers are known by those of ordinary skill in the art. In one embodiment, the Internet server 230 comprises a Pentium™ based computer network server utilizing a windowsNT™ based operating system or a Linux™ operating system. Apache™ Web Software hosts the third party verification system web page to thereby allow World Wide Web access to the recorded verification information.

The Internet server 230 connects to the Internet 244 and the PSTN 240 to facilitate access by a remote user, such as a L.D.T.S.P. 110, via the Internet 244 or PSTN 240.

FIG. 3 illustrates an exemplary sample record 300 as might be recorded by a voice response unit 218 and stored on a voice print server 212 operating in accordance with the subject invention. Preferably, each record 300 is arranged as a number of fields of information as is common in database records. As shown, the example record 300 comprises a record number field 302 designed to identify the record at the exclusion of other records. Also included is a name field 304, address field 306, and fields for other personal information, such as a social security number field 308, and birth date field 310. The personal information fields are often used for security purposes to verify the identity of the individual. It is anticipated that the textual information contained in fields 302-310 is displayed on a computer screen or other form of display when the record is remotely accessed at a later time. Information displayed in fields 302-310 is obtained and entered by the L.D.T.S.P. caller and uploaded to the third party verification system or may be obtained by the third party verification system in non-verbal form.

The example record also includes a digitized voice recording field 312. The voice recording field 312 contains the digitized voice recordings of the individuals' responses to questions posed by the voice response unit. Examples of the types of question that are presented by the voice response unit 218 include, but are not limited to, the individuals' name, address, telephone number, social security number, birth date, and the responses to various questions posed by the voice response unit. The voice response unit 218 may of course be programmed with any of a number of application-specific questions. In the example embodiment described herein, the questions posed are directed to gain the consent from the customer or individual connected to the voice response unit to change long distance telephone service providers.

Additional storage fields 314 are optionally included in the record to provide additional flexibility to record additional information.

In other embodiments, it is contemplated that the voice or computer text script could be adapted to record various other types of data including but not limited to voting, polling, purchasing, changing service providers, club membership, subscription purchasing, appointment scheduling, or other form of verification mentioned above.

Operation

In operation, the present invention may be configured to function with data recording and retrieval interfaces via a telephone or computer. For purposes of brevity only the Internet access and telephone access methods are discussed in detail herein. However, it is contemplated that other means of recording and accessing the data may be used to achieve the operation of the present invention.

Figure 4:
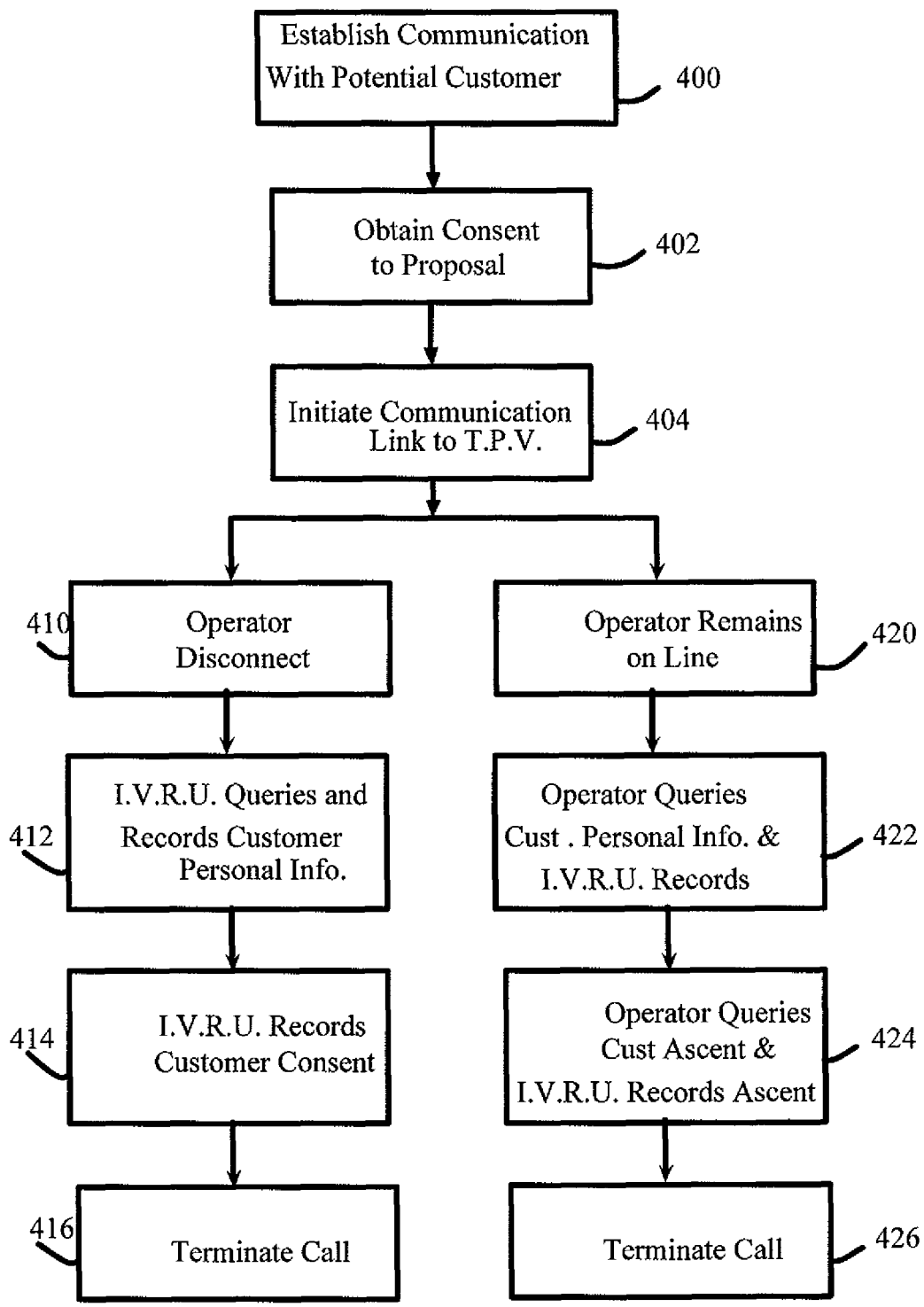
FIG. 4 is an operational flow diagram of an example process for obtaining third party verification via a telephone connection.

FIG. 4 illustrates an operational flow diagram of one exemplary method of operation of the present invention. The operation shown, customized for obtaining consent from a potential customer, is utilized to obtain consent with third party verification from the potential customer. At a block 400, the operation establishes communication with a potential customer. Most often this is performed via a direct telephone connection over the PSTN although in other embodiments the communication link may exist over another medium.

Next, at a block 402, the operation attempts to obtain consent from the potential customer. Most often block 402 is achieved via personal voice communication by a live operator who is able to express the advantages of the proposed good or service, such as the new long distance carrier service, and interact with the potential customer.

While the personal and interactive communication from live operator contact often proves most productive, the process may also be initiated by a computerized and automated voice response unit that attempts to obtain third party verification prior to with communication from a live operator. Causing the voice response unit to initiate the call and obtain initial confirmation from the potential customer reduces the number of calls with which the live operator must interface thereby reducing the number of live operators and the cost of operation. Initial screening may be undertaken by recognizing DTMF tones provided by the potential customers in response to queries from the voice response unit.

Upon obtaining consent or other particular response, the operator initiates a communication link to a third party verification system. This occurs at a block 404.

Next, the operation branches to different routines depending on whether the operation will be a "blind transfer" or a "conference and transfer" type handoff. The left-hand branch of the details a blind transfer while the right-hand branch details a conference and transfer.

At a block 410, the operator disconnects from the line when the third party verification system connects or a short time before or after the third party verification systems connects. This is known as a blind transfer. Next, at a block 412, the interactive voice response unit (I.V.R.U.) queries and records customer information including but not limited to personal information regarding the potential customer. This information is temporarily stored in digital or analog format on the voice response unit.

Next, at a block 414, the interactive voice response unit queries the potential customer regarding consent to change long distance service providers and records the response. At a block 416 the process is terminated.

Alternatively, the operator may initiate a conference and transfer handoff as shown in blocks 420-426. At a block 420, the operator stays on the line. Next, at a block 422 the operator queries the customer for personal information and records this information. At a block 424, the operator queries the customer for consent to change service providers, or any other question for which recorded verification is desired. Upon obtaining consent the call is terminated, block 426.

Figure 5:
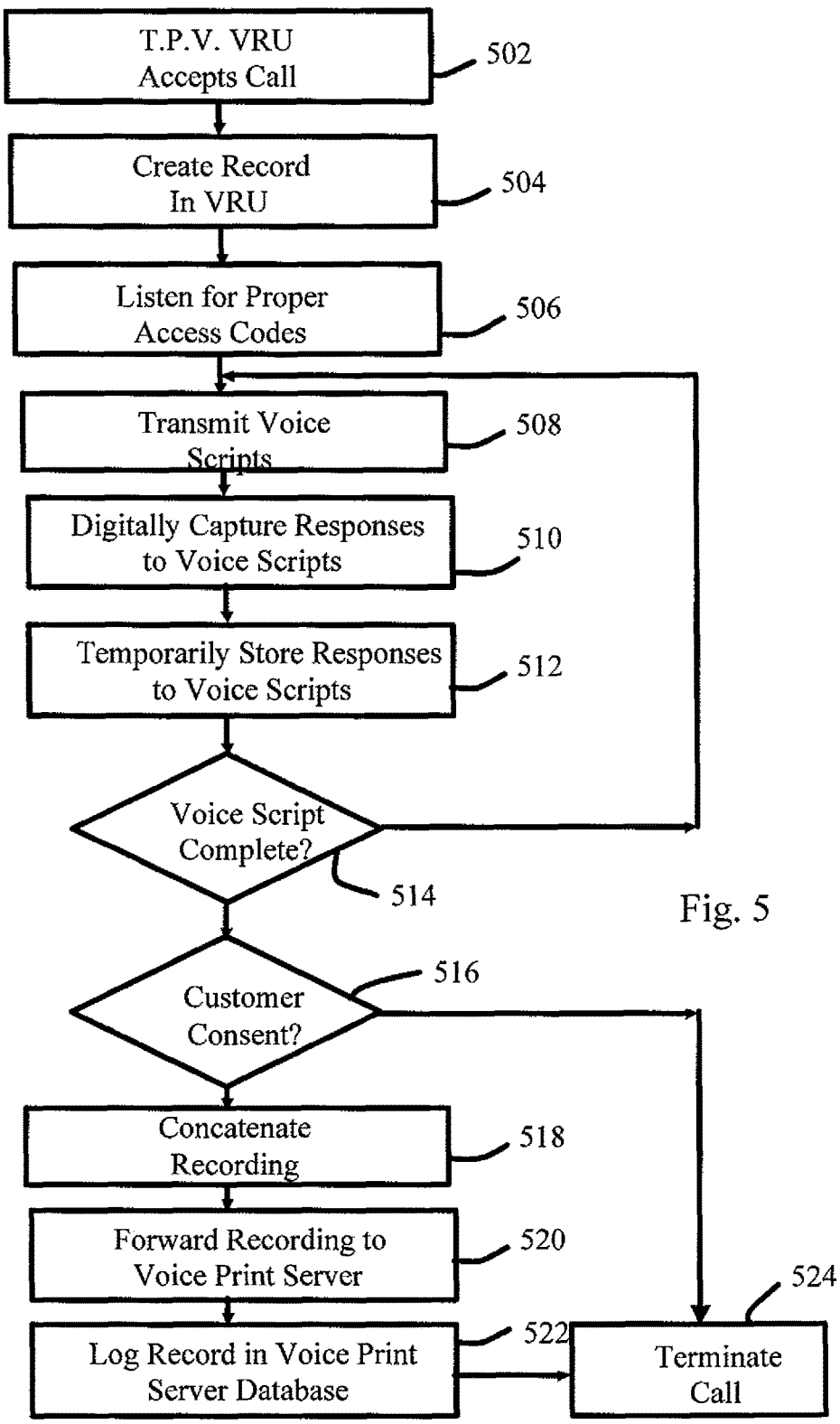
FIG. 5 is a detailed operational flow diagram of an example process for obtaining third party verification via a telephone connection.

FIG. 5 illustrates a more detailed operational flow chart of one exemplary method of operation of third party verification recording by telephone. This operational flow chart provides a more detailed description of blocks 404-416 shown in FIG. 4.

At a block 502, the voice response unit of the third party verification system accepts the call from an outside party or other system, such as an operator requiring third party verification. Next at a block 504, the voice response unit creates a record to store data from the potential customer. This record, as shown in FIG. 3, may include data as from DTMF tones or recorded voice or video clips of responses.

Next, at a block 506, the operation monitors for the proper access codes from the party requesting access to the third party verification system. Access codes or authorization code may be automatically sent from the requesting party telephone or may be manually entered as DTMF tones.

Upon gaining access to the system, the operation progresses to a block 508 wherein the voice response unit transmits or plays voice scripts to the one or more parties connected to voice response unit, including the potential customer. It is anticipated that at least part of the voice script from the voice response unit requests interaction by the potential customer. Hence, at a block 510, the voice response unit captures the responses to the voice scripts.

In one alternative embodiment, at least one question from the voice response unit is whether the potential customer consents to a particular statement and requests the potential customer to press a particular telephone key to express a particular response to a question from the voice response unit. The response of the DTMF tone directs the third party verification system to one or more branches to facilitate various lines of potential questioning.

Next, at a block 512, the voice response unit stores the voice responses to the questions or requests posed by the voice response unit. These verbal responses are digitized and temporarily stored in the voice response unit.

Next, the operation progresses to a decision block 514 wherein the operation determines if the voice scripts are complete. If the voice scripts are not complete, the operation returns to a block 508 wherein additional voice scripts are transmitted.

If at block 514, the voice script process is complete, the operation progresses to a decision block 516. Here the operation determines whether customer consent was provided or whether the desired response was obtained such that the record electronically existing in the voice response unit should be written to the voice print server. If the desired response was not obtained then the process terminates and the record information in the voice response unit is deleted. Alternatively, the record information in the voice response unit may be stored in a file containing failed or non-consenting records.

In one embodiment, a speech recognition algorithm is utilized to determine if the desired response was provided. In another embodiment, the voice response unit requests that in addition to a verbal response, a button be pressed to generate a DTMF tone to confirm a response.

If the potential customer provided the desired consent, the operation progresses to a block 518, wherein the voice response unit concatenates the recording of the personal information and the verbal consent or verbal responses to one or more particular questions, such as a desire to change long distance service providers. Next, at a block 520, the voice response unit forwards the data record over the network to the voice print server for cataloging and storage.

At a block 522, a voice print server database program logs the record into a database storage system. Thereafter, the operation progresses to block 524, wherein the call is terminated.

In this manner, the vocal consent of the person or entity is recorded and stored using the third party verification system such that it may be retrieved as a form of verification at a later time.

Figure 6:
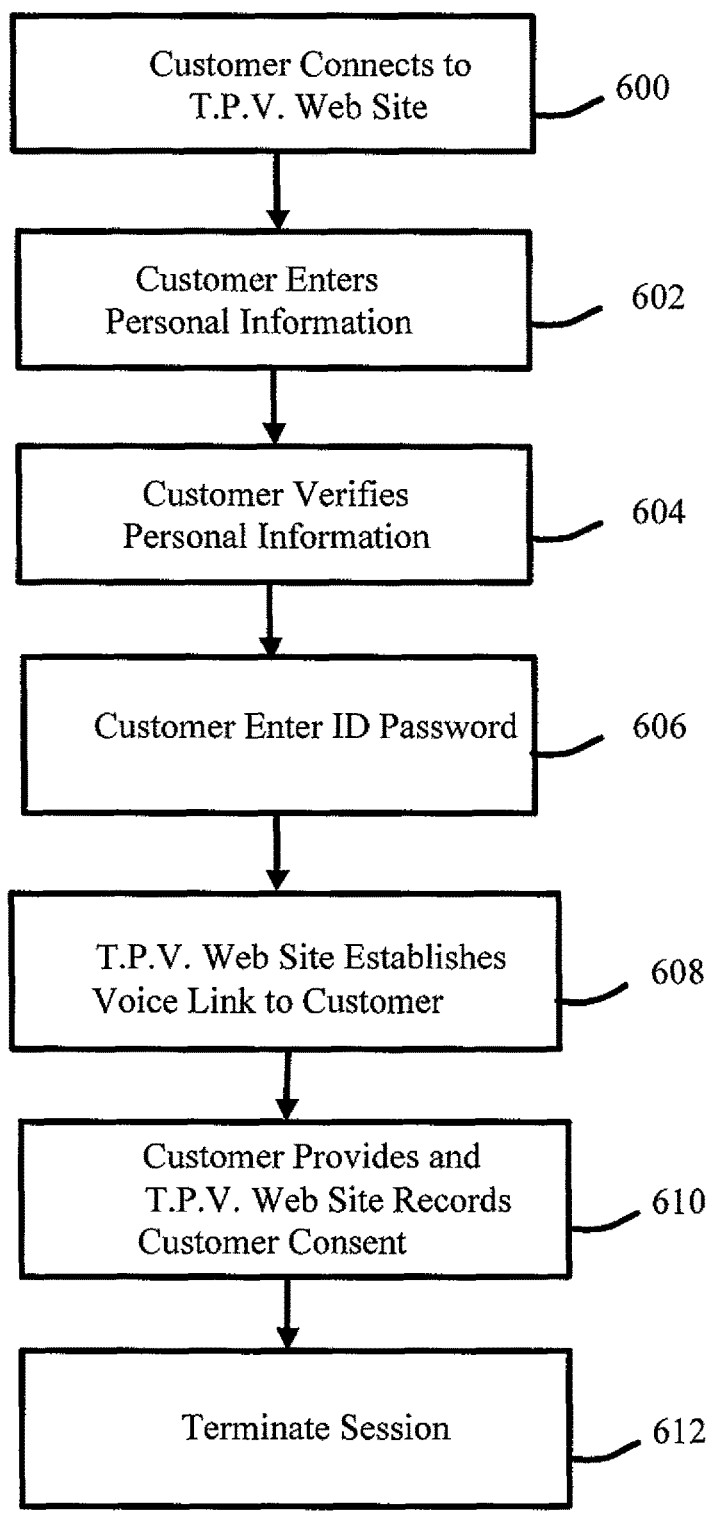
FIG. 6 is an operational flow diagram of an example process for obtaining third party verification via a computer connection.

FIG. 6 illustrates an example method of operation for establishing a third party verification via the Internet. Using this example method of operation, a potential customer may initiate the process of changing long distance service providers. At a block 600, the potential customer connects to the third party verification web site and may optionally obtain information regarding any of a number of different goods or services, and personally select one of the goods or services to purchase.

Next, at a block 602, the operation requests that the customer enter personal information about himself/herself. Next, at a block 604, the operation verifies the potential customer's personal data.

At a block 606, the operation requests the potential customer to enter and upload an identification password or ID number. The identification password identifies the person to provide a verification of identity. For example, the identification password or ID number may be sent to the individual via mail to a verified address or may be provided by telephone at a verified telephone number. The ID number or password identifies the person for establishing verification. In an alternative embodiment, the third party verification web site detects the customer's IP address based on ANI numbers or on packet switch data addresses.

Next, at a block 608, the operation establishes a voice link with the potential customer to facilitate recordation of a voice sample indicating consent to the change or query. For example, the potential customer may consent to change long distance telephone service providers by transmitting a voice signal to the third party verification system. In an alternative embodiment, an audio file of the consent is recorded at the customer computer and uploaded to the third party verification system. In yet another embodiment, the verification is recorded in a video format by a camera connected to the potential customer's computer or to a general use terminal for public use. This information is stored and at a block 612, the process terminates.

Figure 7:
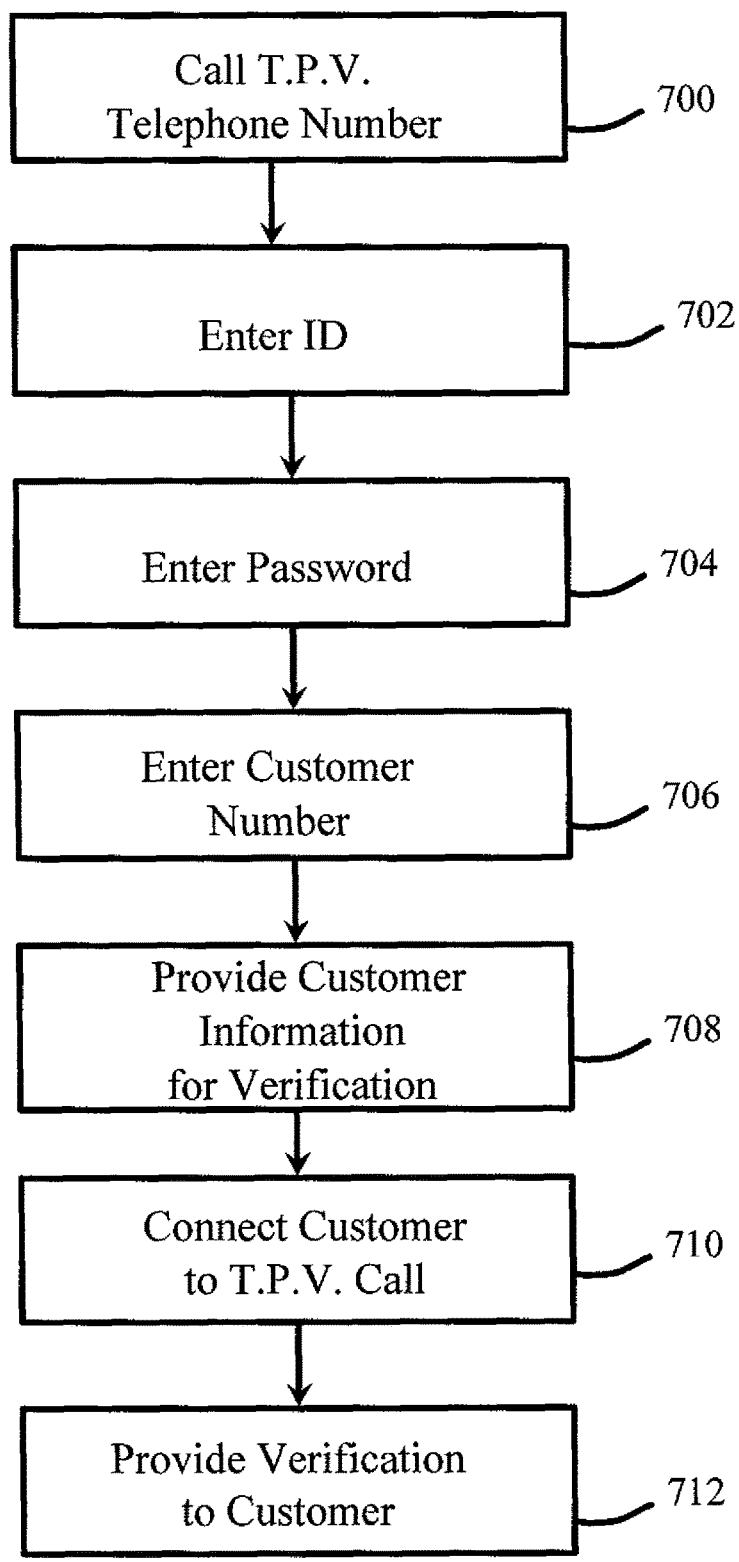
FIG. 7 is an operational flow diagram of an example general process for retrieving third party verification via a telephone connection.

FIG. 7 illustrates an exemplary method of operation for retrieving the verification by telephone. A need exists to retrieve the recorded and stored verbal verification so that, at a later time, verification of the consent or other response can be provided to a requesting party. The process of retrieving stored verification data comprises first calling the third party verification system, in this embodiment, by telephone at a block 700. Next, at a block 702, the calling party enters an identification number to gain access to the system. It is anticipated that the calling party be the client, such as a long distance service provider. In certain configurations, parties other than the client may be provided access to the data stored in the third party verification system. Other such authorized individuals include the FCC or competitors.

Next, at a block 704, the client enters a password as a second requirement to gain access to the system. In alternative embodiment, access occurs automatically based on an analysis of the caller ID information of the calling party.

Next, at a block 706, the calling party enters the record number for which the verification is being sought. In one embodiment, the record number is the telephone number for which long distance service is to be changed. In another embodiment, the record number is randomly assigned. In one embodiment, the requesting party generates DTMF tones to provide the record number. In another embodiment, speech recognition software operates in conjunction with vocal input by the user to provide the record number.

Next, at a block 708, the third party verification system provides record data to the requesting party so that the requesting party may verify that the system retrieved the proper record. In one embodiment, the record data provided at a block 708 includes name, address, and some personal data such as birth date or mother's maiden name.

At a block 710, the requesting party connects a party to the third party verification system so that the party connected to the third party verification system may listen to the voice recording of the recorded consent, block 712.

In reference to FIG. 1, the potential customer or an independent fourth party 140 such as the FCC or a prior provider of long distance service to the customer may request access to the verification system. In such a case, the client would call the third party verification system and, upon obtaining the proper record, patch in or connect the FCC or prior service provider to the call so that they can listen to the recorded verification.

Figure 8:
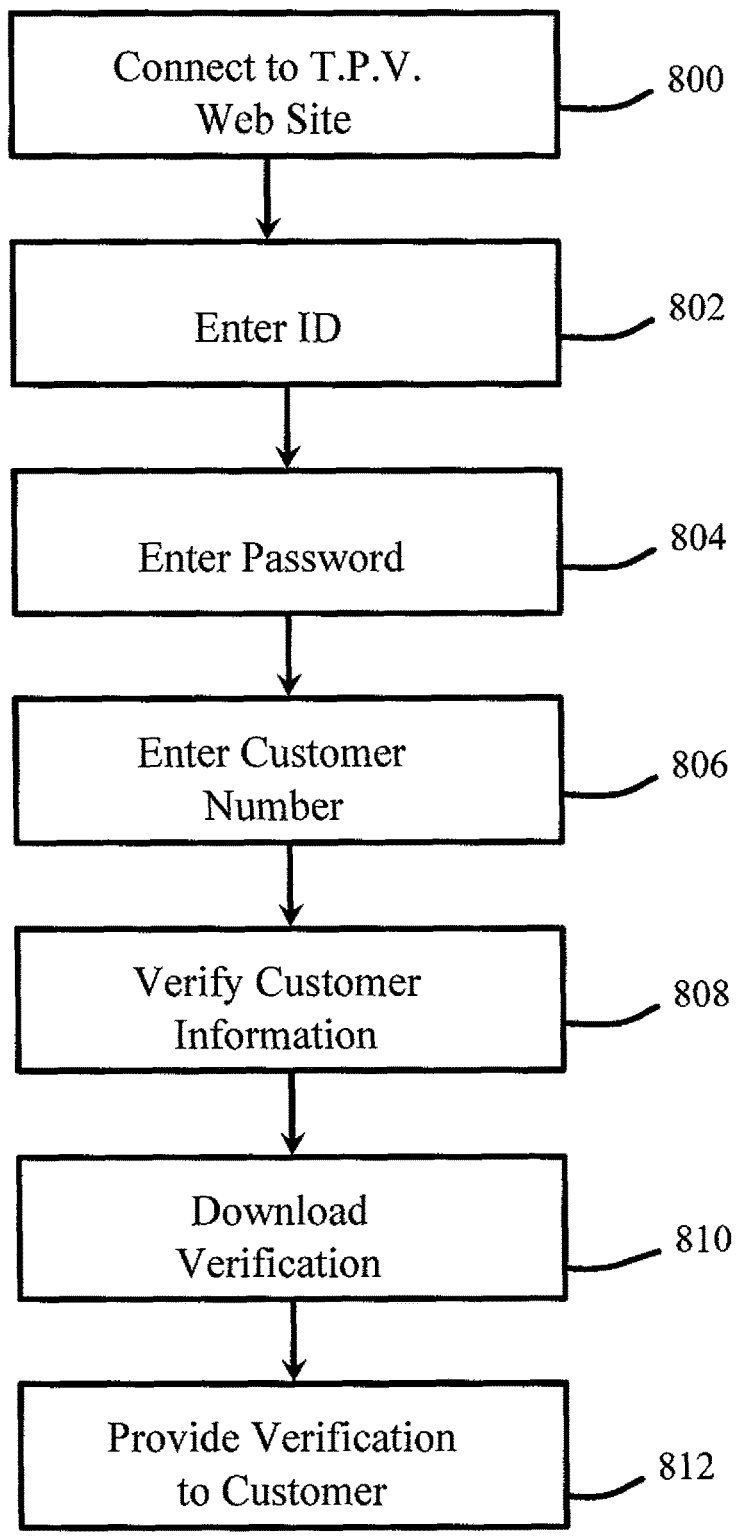
FIG. 8 is an operational flow diagram of an example process for retrieving third party verification via a computer connection.

FIG. 8 illustrates an operational flow diagram of yet another embodiment of the present invention of one method of retrieving verification data over a computer network, such as the Internet. One general method of operation is shown in FIG. 8, wherein at a block 800, the client (user of the third party verification system) connects to a web site of the third party verification system. Once connected, the client enters its identification, block 802, and password, block 804. These steps control access to the web site.

Next, at a block 806, the operation queries the user for a record number or customer number. Upon uploading the record number to the web site server, the web site server accesses the voice print server and downloads to the client of the third party verification system record information such as name, address and social security number of the customer identified by the record. This information is displayed on screen at the client machine. This allows the client to verify that the verification system retrieved the proper record from the voice print server.

Next, at a block 810, the operation allows the client to download the verification. In one embodiment, the verification is a voice file of the customer that is downloaded to the client computer via the Internet. In another embodiment, the verification is a video file containing video footage of a customer that is downloaded to the client computer via the Internet. The verification provides independent and third party obtained confirmation that the customer consented or responded in a particular manner to previous questions.

Next, at a block 812 the client provides the verification to the customer or to any party requesting the verification. In one embodiment, wherein the party seeking the verification is connected to the client via telephone, audio verification is played to the party over the telephone or the audio file is transferred to the party, such as via e-mail. In another embodiment, video verification is provided to the party via e-mail or video telephone.

Figure 9:
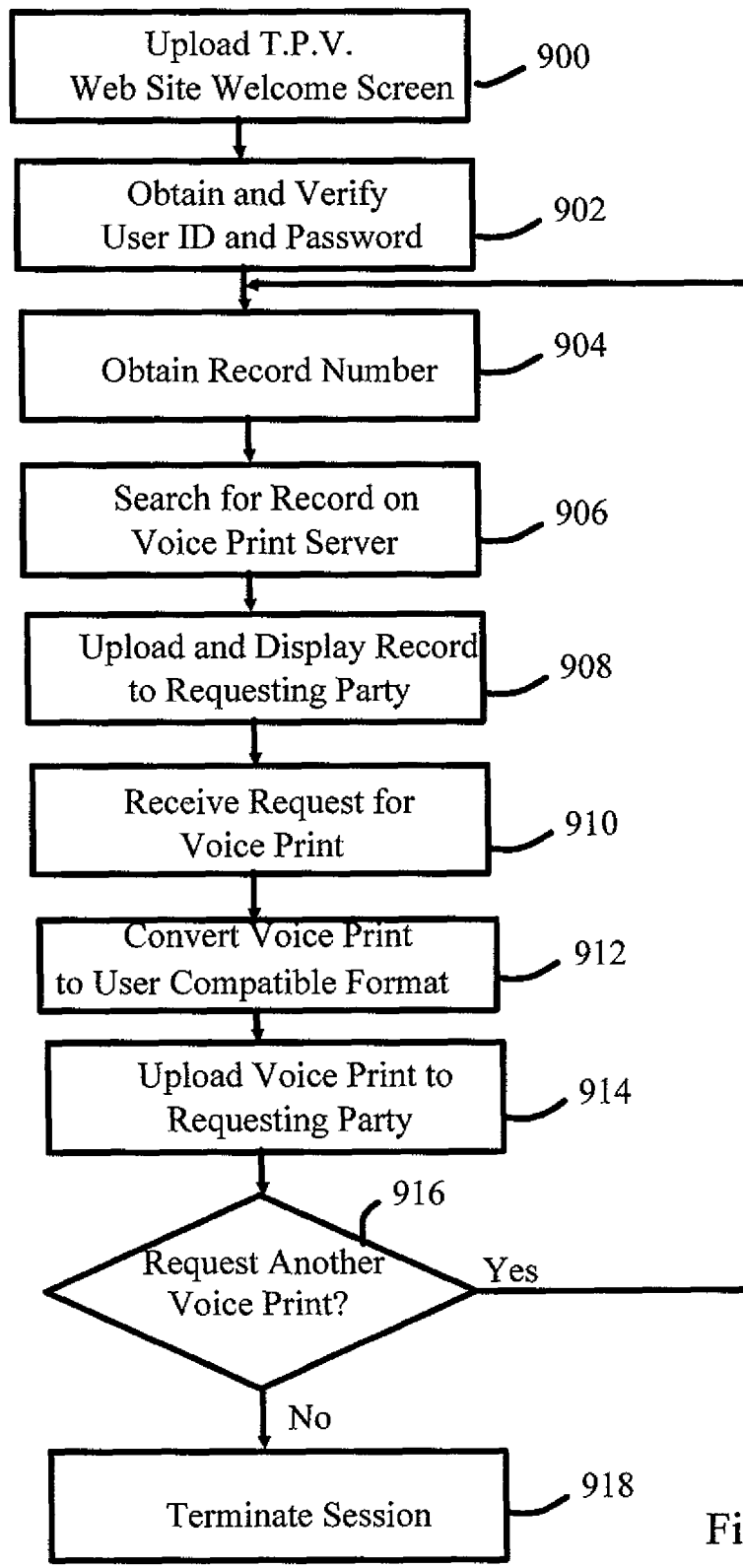
FIG. 9 is a detailed operational flow diagram of an example process for retrieving third party verification via a computer connection.

FIG. 9 illustrates in detail a method of operation of retrieving third party verification over a computer connection such as the Internet. In a block 900, the client uploads a welcome screen from the third party verification web server. Next, at a block 902, the third party verification web server obtains and verifies the user identification and password against an existing database established by the operators of the third party verification system.

At a block 904, the web server obtains the record number from the client accessing the web site to gain the verification. In other embodiments, the web site is advantageously accessible by others besides the client, such as customers, government agencies, or competitors.

At a block 906, the web server accesses the voice print server to obtain the record data. Upon finding the data, the web server causes the operation to upload the data to the accessing party's computer and display the record data on the display, block 908. Most often this data appears as a textual display. Transfer of data via a computer network, such as the Internet, is known by those of ordinary skill in the art and accordingly is not described in great detail herein.

If the displayed information indicates that the web server retrieved the desired record, then at a block 910, the web server would receive a request from the client for the verification file. The verification file may comprise data in an audio, video, or other similar format that provides confirmation or verification of a response by a potential customer, individual, or entity. In one example embodiment, the verification file is an audio clip of a potential long distance telephone service customer consenting to change long distance service providers.

Next, at a block 912, the web server performs a conversion process on the voice print file to alter the alter the file to a format that may be understood by a personal computer connected to the computer network. In one example embodiment, a Dialogic™ voice capture card records the voice of the party as they respond to questions. The recorded responses are converted to a digital format and are stored in an ADPCM format (adaptive differential pulse code modulation). In general, the ADPCM format is not compatible with personal computers and hence it must be converted to a new format, such as WAV format. This occurs at the block 912.

Next, at a block 914, the web server uploads the converted voice print file to the requesting party, such as for example, the client. The client can then listen to the voice print on their computer. Alternatively, the voice print can be patched into and played for a caller requesting verification or downloaded, such as via e-mail, to any desired party.

At decision block 916, the web server queries the client to download additional voice prints. If the client desires to access and download additional voice prints, the process returns to a block 904. If the client does not have any other voice prints to download, then the operation progresses to a block 918, wherein the operation terminates, such as by automatically logging the client or user out of the web server.

Voice Fingerprint System

In an alternative embodiment, the above described third party verification system includes a voice fingerprint system configured to compare two or more samples of voice and pattern match the voice samples to determine if the two or more samples were spoken by the same individual. An embodiment of the present invention having the voice fingerprint system includes a hardware interface within the voice response unit. The voice fingerprint system analyzes a voice sample, such as a person speaking their first and last name. This voice sample analysis is stored and may be appended to the record data or stored separately. The voice sample is the voice fingerprint of the individual, whereby through the use of complex sampling and statistical analysis, a unique identification of the speaker's speech patterns, inflections, tone, and speech speed is created. This unique identification or fingerprint is then cataloged and stored with the particular record number.

If, at a later time, the consent or response of a person is questioned or if verification beyond that provided by the process described in FIGS. 4-9 is required, the stored voice finger print may be compared to a second sample taken from the individual. For example, if the individual refutes the recorded verification then they can call and undergo a second sampling, such as by speaking their first and last name. The voice fingerprint system analyzes the second sample and compares the results of the second sample to the stored results of the first sample. If the sample results match, then further conformation or verification is achieved. An example voice verification system compatible with this embodiment of the present invention is available from Nuance Communications of Menlo Park, Calif.

Figure 10A:
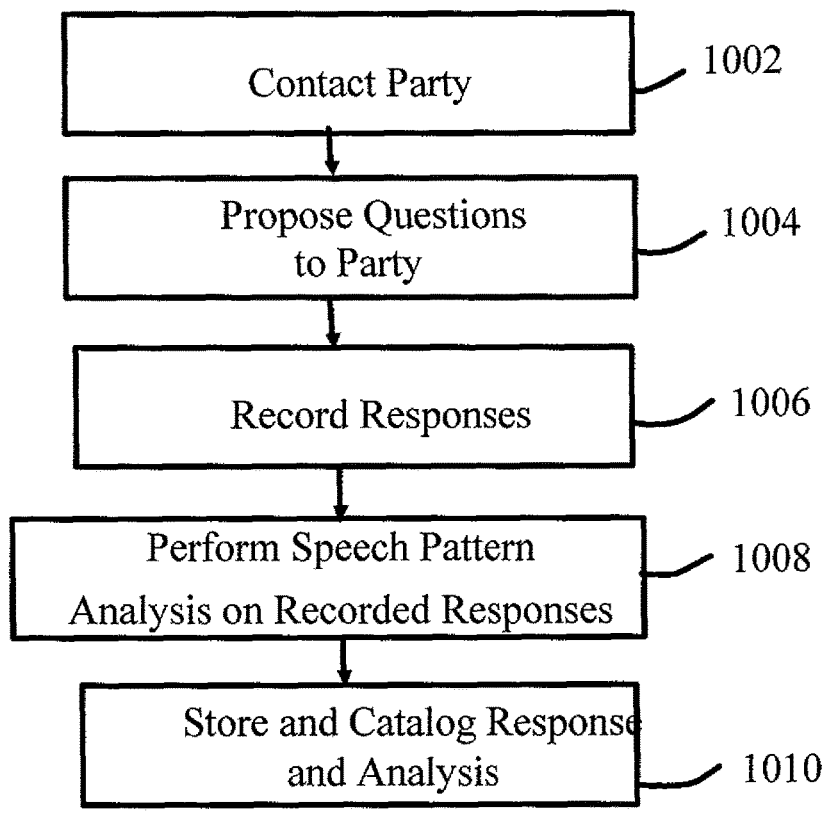
FIGS. 10A and 10B are operational flow diagram of an example process for third party verification including speech pattern recognition.
Figure 10B:
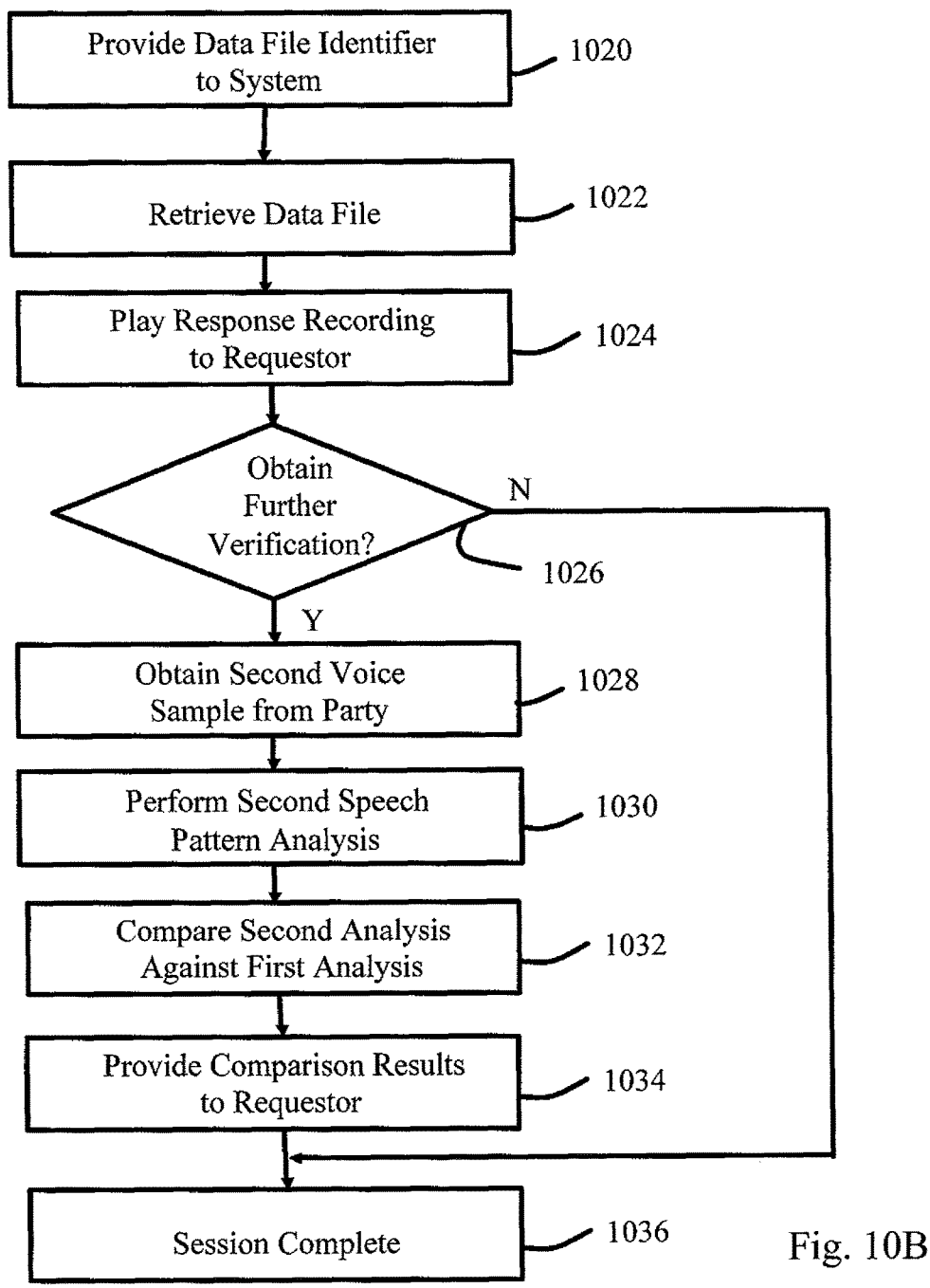

FIGS. 10A and 10B illustrate an operational flow diagram of an example process of the present invention having speech pattern recognition. The process is now discussed. Referring to FIG. 10A, at a block 1002, the operation contacts a party to obtain consent or a particular response. Next, at a block 1004, a voice response unit proposes questions to the party. The operation, at block 1006, records the responses to the questions. A single or a plurality of response may be recorded.

Next, at a block 1008, the operation performs speech pattern analysis on the recorded responses. In one embodiment the analysis occurs in real time when the party makes the response. In another embodiment the analysis occurs after the voice response unit records the response.

At a block 1010, the operation catalogs and stores the responses on a storage media, such as a hard disk drive. Once stored, the recorded response and analysis may be retrieved at a later date.

FIG. 10B is an operational flow diagram of a example method of retrieving the stored response and analysis and performing the voice verification. This process involves the sampling of a second speech sample so that the system can perform a second analysis and subsequently compare the two analyses to provide further verification of identity.

Turning now to FIG. 10B, at a block 1020, a user or requestor of verification provides a data file identifier, often in the form of a numeric identifier, to the system. This identifies the data file, containing the response and analysis data, at the exclusion of other data files.

Next, at a block 1022, the operation retrieves the data file from a storage device. At a block 1024, the operation plays the recording of the response for the requestor. The playing of the response is a first form of verification.

Next, at decision block 1026, the operation inquires whether additional verification is required. If at block 1026 the requestor desires further verification, the operation progresses to a block 1028, wherein the system obtains a second voice sample from the party in question. It is contemplated that at least one voice response from the party be provided that is the same word or words as contained in the first recorded response. The second voice sample is preferably obtained from the party with a known identity. Thus, the identity of the second voice sample provider is preferably independently verified by some form of identification.

Next, at a block 1030, the operation performs speech pattern analysis on the second speech sample. In one embodiment this analysis is the same type of analysis as performed in block 1008 of FIG. 10A.

Next, at a block 1032, the operation compares the analysis results from the first speech pattern analysis that were retrieved from storage, with the analysis of the second speech sample. This comparison reveals if the same party spoke the first speech sample and the second speech sample.

Next, at block 1034, the operation provides the results of the comparison to the requestor. These may be provided via a computer network, over an Internet connection, audibly over a telephone connection, or any other means suitable for communicating results of the comparison. At a block 1036, the session is complete. Likewise, if at decision block 1026 the requestor does not require additional verification, the operation progresses to block 1036 and the session is complete.

FIG. 11 is a combined flowchart and data flow diagram 1100 illustrating various components used to implement an enrollment process according to the invention. As shown in FIG. 11, an account holder 1110 who has received account from an issuer 1230 may activate his or her account by contacting a voice response unit (VRU) 1120, for example by placing a telephone call to a telephone number associated with the VRU 1120. The VRU 1120 may be operated directly by the issuer 1230, or by a third party under contract with the issuer 1230. During an automated interaction between the VRU 1120 and the account holder 1110, the account holder 1110 may provide his or her account number along with at least one control voice print, as represented by the arrow 1115 appearing in FIG. 11, to the VRU 1120. The VRU 1120 processes the control voice print as necessary, and then forwards the control voice print and the associated account number, as represented in FIG. 11 by the arrow 1125, to the storage medium 1130 for storage.

The storage medium 1130 is adapted as understood by those skilled in the art to associate the control voice prints with the corresponding account numbers so as to facilitate search and retrieval of the control voice print by using the account numbers as a key or index field for searching. The embodiment of the invention illustrated in FIG. 11 may be used to enroll credit card holders in an automated system to verify that subsequent transactions associated with the issued account, such as a credit card account, are legitimate, by comparing the voice sample of the consumer attempting to complete the transaction with the control(s) voice print stored in the storage medium 1130 at the time of enrollment. Consistent with the known practice of having multiple authorized users of a given credit card account, such as by issuing separate plastic cards to each one for countersignature, the system shown in FIG. 11 can be extended to store voice prints for each one of the several users authorized to access a given account.

FIG. 12 is a combined block diagram and data flow diagram 1200 illustrating various components that can be used to implement systems and methods for verifying that a consumer seeking to transact with a merchant using an account is authorized to use that account. Assume, for example, that consumer 1210 purports to be authorized to use an account, such as a credit card account, issued by issuer 1230, and wishes to transact with the merchant 1220 using that account. Issuer 1230 may utilize various components illustrated in FIG. 12 to verify that the consumer 1210 is authorized to use the account, including VRU 1120, voice print comparator 1240, and storage medium 1130.

The voice response unit 1120 may be adapted to interact with the consumer 1210 to obtain an account number and a test voice print, for example, while conducting a telephone-based interaction with the consumer 1210 conducted at transaction-time. The voice response unit 1120 may then forward the account number to the storage medium 1130, which is adapted to search for any control voice print(s) associated with the input account number, and to return the same upon request to the voice response unit 1120.

If no control voice print matches the input account number, the voice response unit 1120 can notify the merchant 1220 accordingly, thereby alerting the merchant 1220 to possible fraud being attempted by the consumer 1210. Otherwise, if the storage medium 1130 returns one or more control voice prints to the voice response unit 1120, the voice response unit 1120 forwards the control and test voice prints to a voice print comparator 1240.

Voice print comparator 1240 functions to compare the input voice prints, and determine whether both input voice prints were spoken by the same human person by extracting and analyzing certain parameters associated with the voice prints. The voice print comparator 1240 returns a match level signal to the voice response unit 1120 that indicates a level of match between the input control voice print and the test voice print. As discussed above, suitable technology for implementing the voice print comparator 1240 may be available from a variety of vendors including, for example, Nuance Corporation discussed above.

Having received the match level signal from the voice print comparator 1240, the voice response unit 1120 can notify the merchant 1220 whether the test voice print from the consumer 1210 matches any control voice prints associated with the number of the account submitted by an authorized user of the account, by using the enrollment methods and apparatus of FIG. 11. The VRU 1120 may forward the match level signal, or a variant of the same, to the merchant 1220, or simply give the merchant 1220 a yes-or-no response. The VRU 1120 or the merchant 1220 can analyze the value assigned to the match level signal, compare it to a predefined threshold, and determine whether or not to approve the transaction proposed by the consumer 1210. If the match level exceeds the predefined threshold, VRU 1120 or the merchant 1220 may determine that the risk of fraud is minimal and may be proceed with the transaction proposed by the consumer 1210. Otherwise, if the match level signal falls beneath the predefined threshold, the VRU 1120 or the merchant 1220 may conclude that the risk of fraud present in this transaction does not justify completing the transaction, and therefore may decline the transaction proposed by the consumer 1210.

According to various illustrative embodiments of the invention, the systems and methods illustrated in FIG. 12 and discussed herein may be especially applicable to credit card transactions wherein the consumer 1210 is geographically remote from the merchant 1220. Such remote transactions are characterized in the art as non-face-to-face transactions, and in the credit card context, the merchant 1220 may bear the risk of any fraudulent transactions into which the merchant 1220 inadvertently enters with consumer 1210. Accordingly, the systems and methods illustrated in FIGS. 11 and 12 and discussed herein may have particular applicability to enable the merchant 1220 to minimize losses due to fraudulent transactions inadvertently entered into with the consumer 1210 by identifying fraudulent transactions before they occur.

While particular embodiments and examples of the present invention have been described above, it should be understood that they have been presented by way of example only and not as limitations. Those of ordinary skill in the art will readily appreciate that other various embodiments or configurations adopting the principles of the subject invention are possible. The breadth and scope of the present invention is defined by the following claims and their equivalents, and is not limited by the particular embodiments described herein.

What is claimed is:

1. An apparatus, comprising:
   a voice response unit configured to:
     obtain a test voice print during a transaction between a consumer and a merchant; and
   a storage medium configured to:
     store information associated with the consumer; and
     store a control voice print associated with the information; and
   a voice print comparator configured to:
     receive the control voice print associated with information associated with a consumer;
     compare the test voice print from the voice response unit to the control voice print;
     determine a match level signal indicating a degree of match between the test voice print and the control voice print;
     compare the match level signal and a predefined threshold; and
     determine an approval for a transaction based on the comparison of the match level signal and the predefined threshold.

2. The apparatus of claim 1, wherein the transaction is a telephone-based transaction.

3. The apparatus of claim 1, wherein the consumer is seeking to conduct a credit card transaction, and wherein the test voice print is associated with a holder of a credit card account.

4. The apparatus of claim 1, wherein the voice response unit is configured to obtain the information from a holder of the account or the merchant.

5. The apparatus of claim 1, wherein the information is a credit card account number.

6. The apparatus of claim 1, wherein the voice response unit is configured to forward the information and the test voice print to the storage medium.

7. The apparatus of claim 6, wherein the voice print comparator is further configured to obtain the control voice print associated with the information and the test voice print from the storage medium.

8. A method, comprising:
   obtaining, by a voice response unit, a test voice print and consumer information from a consumer, wherein the obtaining is performed during a transaction between the consumer and a merchant;
   forwarding, by the voice response unit, the consumer information to a storage medium, wherein the storage medium searches for a control voice print associated with the consumer information;
   sending, by the voice response unit, the test voice print and the control voice print associated with the consumer information to a voice print comparator; and
   receiving, by the voice print comparator, the control voice print from the voice response unit associated with the consumer information, the receiving further comprising:

determining a match level signal indicating a degree of match between the input voice print and the control voice print associated with the consumer information;

comparing the match level signal and a predefined threshold; and determining an approval for a transaction based on the comparison of the match level signal and the predefined threshold.

9. The method of claim 8, wherein the transaction is a telephone-based transaction.

10. The method of claim 8, wherein the consumer is seeking to conduct a credit card transaction, and wherein the voice response unit is configured to obtain the test voice print associated with a holder of a credit card account.

11. The method of claim 8, wherein the consumer information is obtained from a holder of an account or a merchant.

12. The method of claim 8, wherein the consumer information is a credit card account number.

13. The method of claim 8, wherein the obtaining is performed during an account activation procedure.

14. The method of claim 8, wherein obtaining the consumer information includes obtaining a credit card account number.

15. The method of claim 8, comprising storing, the voice print and the consumer information in a data structure so that the consumer information serves as a key field to facilitate search for and retrieval of the voice print.

16. A non-transitory computer readable medium comprising instruction, that when executed by the processor, cause the processor to:

obtain, by a voice response unit, a test voice print and consumer information during a transaction between a consumer and a merchant;

send the consumer information to a storage medium, wherein the storage medium searches for a control voice print associated with the consumer information;

forward the test voice print and the control voice print associated with the consumer information to a voice print comparator, the forwarding including:

comparing the test voice print from the voice response unit, to the control voice print;

determining a match level signal indicating a degree of match between the test voice print and the control voice print associated with the consumer information;

comparing the match level signal and a predefined threshold; and determining an approval for a transaction based on the comparison of the match level signal and the predefined threshold.

17. The non-transitory computer readable medium of claim 16, wherein the transaction is a telephone-based transaction.

18. The non-transitory computer readable medium of claim 16, wherein the consumer is seeking to conduct a credit card transaction, and wherein the test voice print is associated with a holder of a credit card account.

19. The non-transitory computer readable medium of claim 16, wherein the information is obtained from a holder of the account or a merchant.

20. The non-transitory computer readable medium of claim 16, comprising instructions, that when executed by the processor, cause the processor to obtain the test voice print and the consumer information during an account activation procedure.

* * * * *